3,692,481
Patented Sept. 19, 1972

3,692,481
METHOD OF DETERMINING THE CONCENTRATION OF INORGANIC SULFUR COMPOUNDS IN A GAS
James E. Mitchell, Westfield, N.J., assignor to Esso Research and Engineering Company
No Drawing. Filed Mar. 30, 1971, Ser. No. 129,600
Int. Cl. G01n 31/12
U.S. Cl. 23—230 PC
10 Claims

ABSTRACT OF THE DISCLOSURE

The concentration of inorganic sulfur compounds is determined by measuring the ion concentration decrease of a flame, produced by the combustion of a mixture comprising a hydrocarbon, hydrogen and oxygen, which results from introducing said inorganic sulfur-containing compound into said flame. Preferably the inorganic sulfur compound is chosen from the group consisting of $SO_2$, $SO_3$, $H_2S$, COS, S, $H_2SO_4$ and $H_2SO_3$, and the ion concentration decrease is measured by a decrease in current flowing through an electrical circuit of which the flame is an integral part. In a particularly preferred method, a gas chromatograph fitted with a flame ionization detector and a recorder is used to measure the concentration of said inorganic sulfur compound by introducing said inorganic compound into a reference mixture, comprising $H_2$, $O_2$ and hydrocarbon, and measuring the ion concentration decrease.

FIELD OF THE INVENTION

The concentration of inorganic sulfur compounds is determined by measuring the ion concentration decrease of a flame, produced by the combustion of a mixture comprising a hydrocarbon, hydrogen and oxygen, which results from introducing said inorganic sulfur-containing compound into said flame. Preferably the inorganic sulfur compound is chosen from the group consisting of $SO_2$, $SO_3$, $H_2S$, COS, S, $H_2SO_4$ and $H_2SO_3$, and the ion concentration decrease is measured by a decrease in current flowing through an electrical circuit of which the flame is an integral part. In a particularly preferred method, a gas chromatograph fitted with a flame ionization detector and a recorder is used to measure the concentration of said inorganic sulfur compound by introducing said inorganic compound into a reference mixture, comprising $H_2$, $O_2$ and hydrocarbon, and measuring the ion concentration decrease.

BACKGROUND OF THE INVENTION

Prior art

It is known in the gas chromatography art that when hydrocarbons are burned in a mixture of hydrogen and oxygen charged species are formed. The concentrations of these charged species are several orders of magnitude greater than would be expected from purely thermal processes. Therefore, a chem-ionization theory has been postulated which supposes that ions are produced in reactions among molecular fragments in the flame. A widely accepted reaction of this type is (1) $CH + O \rightarrow CHO^+ + e^-$ It has been demonstrated by Cummins and Hutton, "Ionization in Ethylene-Air-Nitric Oxide Flames," Eleventh Symposium (International) on Combustion, p. 335, The Combustion Institute, 1967, that nitric oxide will diminish the concentration of ions in a flame. They ascribe the decrease in ion concentration to reactions of the type, (2) $CH + NO \rightarrow CO + NH$ which interfere with the reaction involving CH shown above.

More recently, Schaefer, "Analysis of Inorganic Sulfur Compounds by Flame Ionization Detector," Analytical Chemistry, 42, No. 4, pp. 448–456 (Apr. 1970), has discovered the effect of sulfur compounds on the response of a flame ionization detector. Schaefer suggests that the effect of $SO_2$ might come from a reaction such as, (3) $SO_2 + O \cdot \rightarrow SO_3$ which reaction might remove oxygen atoms from the chem-ionization mechanism shown above in (1). The The reasoning here is a posteriori in nature, the decrease in ionization having been found first.

There exists some information that suggests that reaction (3) might be occurring in the flame, Mulcahy, Steven, Ward and Williams, "Kinetics of Interaction of Oxygen Atoms With Sulfur Oxides," Twelfth Symposium (International) on Combustion, p. 323, The Combustion Institute, 1969.

SUMMARY OF THE INVENTION

It has now been discovered that the concentration of ions present in a flame which results from the burning of a mixture of hydrocarbon with hydrogen and oxygen may be reduced by the introduction of inorganic sulfur compounds into said hydrocarbon-hydrogen-oxygen mixture. The measurement of this ion concentration decrease results in a quantitative method for the determination of the concentration of said sulfur compounds. More specifically, $SO_2$, $SO_3$, $H_2S$, COS, S, $H_2SO_4$ and $H_2SO_3$ will, when mixed with hydrocarbon-hydrogen-oxygen in a combustion process, decrease the ion concentration in the flame resulting from said process. The decrease in the ionization is proportional to the concentration of said inorganic sulfur compounds. More specifically, this process is especially useful for the determination of the oxides of sulfur which are known air pollutants. The process of this invention is thus seen to be extremely valuable in detecting these pollutants and useful for policing air quality.

In the method of the instant invention an electrical circuit is formed which comprises the flame from the burning of a hydrocarbon-oxygen-hydrogen reference mixture as part of said circuit. This may be done in various ways, for example a grid having either positive or negative voltage can be placed in proximity with said flame. Voltage to said grid is supplied from an outside source. The burner which will be utilized in the combustion of said mixture will have the opposite voltage from said grid. Together, said burner and said grid will with the flame complete an electrical circuit. Placed in series with this burner and the grid will be a current measuring device, i.e., an ammeter. A mixture of hydrocarbon, hydrogen and oxygen will be fed into said burner where it will be combusted, the ions forming will move to the burner or the grid depending on their charge, and the increased current flowing through the circuit will be measured by the ammeter and recorded. The oxygen required for the combustion can be introduced to said flame from the air surrounding the burner opening. A source of said inorganic sulfur compound will be introduced into the reference mixture of hydrocarbon, hydrogen and oxygen and the corresponding decrease in current will be measured. Said decrease is related to the decrease in ionization of said flame and related to the concentration of said inorganic sulfur compound introduced into said combustible mixture.

It is possible within the scope of this invention to measure inorganic sulfur-containing compound present in the atmosphere surrounding said burner. In this case, of course, the ionization of the reference mixture will have to be determined in the absence of said atmosphere. Thus, it is seen that the instant method is extremely flexible and useful for air pollution measurements.

In a preferred embodiment the method of the instant invention is utilized in conjunction with a gas chromatograph. Said gas chromatograph will have a flame ionization detector which will measure the variation in flame ionization due to the addition of various gases.

In the gas chromatographic method, which is utilized for the analysis of hydrocarbons, a reference point is determined by combusting a mixture of hydrogen and an inert gas in the atmosphere. When a hydrocarbon containing compound is introduced into said hydrogen-inert gas mixture an ion concentration increase occurs in the flame. This ion concentration increase is reflected by a corresponding increase in current flowing through a circuit of which the flame is an integral part. Said current increase is detected by a current measuring device (i.e., ammeter), recorded by a recorder and read out directly. Concentration of said hydrocarbon is proportional to the response of said recorder.

In the instant method a small amount of hydrocarbon, that is from approximately 10 p.p.b. to 10% by volume, is mixed with hydrogen and combusted in the oxygen-containing atmosphere surrounding the flame of a flame ionization detector. The current flowing through the flame is detected and an electrical signal is fed to a recorder which will record said current. A source of inorganic sulfur is then mixed with said hydrogen-hydrocarbon mixture and a corresponding decrease in ion concentration is measured by a decrease in current as shown by said recorder. In the instant method, as in the standard gas chromatographic analysis, an inert gas may be utilized in the combustion mixture. Said inert gas may be chosen from the group consisting of helium, nitrogen, argon, neon, xenon, krypton, carbon dioxide, etc.

The method of the instant invention can also function for the analysis of inorganic sulfur compounds without the corresponding gas chromatographic equipment. Flame ion concentrations can be determined by a small electrostatic probe immersed in the flame in a manner similar to that described by Su and Lam, Physics of Fluids, 6, p. 1479 (1963). An electrostatic probe can be used for measuring the ion concentration decrease of a flame which occurs as a result of introducing nitric oxide into a standard combustion mixture comprising oxygen and hydrocarbon as was shown by Cummins and Hutton (supra). Other ion concentration measuring methods that can be used include double electrostatic probes, ion cyclotron resonance mass spectrometry, etc.

The scope of the method of the instant invention also includes measuring inorganic sulfur compounds with methods that measure the rate of ion formation rather than the level of ion concentration.

The ratio of hydrogen and hydrocarbon to oxygen can be within the limits of any mixture which can be combusted. Preferably the ratio of hydrogen and hydrocarbon to oxygen is near to the ratio which corresponds to a stoichiometric ratio according to the reaction,

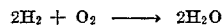

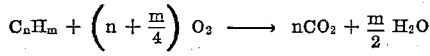

wherein $n$ and $m$ are positive integers.

The volume proportion of the hydrocarbon in the hydrocarbon-hydrogen mixture can be from 10 p.p.b. to 100%, preferably from 10 p.p.b. to 10%, and most preferably from about 10 p.p.b. to 1%. It is also possible to utilize carbon monoxide in place of the hydrogen of the instant invention. In that case the carbon monoxide and hydrocarbon-to-oxygen ratio must be so adjusted so that the mixture will burn.

The hydrocarbons for use in the method of the instant invention include alkanes, alkenes and aromatics having up to 50 carbon atoms. The preferred hydrocarbons for the method of the instant invention include methane, ethane, ethylene, propane, propylene, butane, butylene, benzene, toluene, etc. In general, any hydrocarbon can be utilized as the hydrocarbon of the instant method. Oxygenated hydrocarbons, such as alcohols, ethers, ketones, aldehydes, esters and acids having up to 50 carbon atoms, preferably up to 10 carbon atoms, may be substituted for the hydrocarbon. Especially preferred are methanol, ethanol, propanol, decanol, cyclohexanol, dimethyl ether, diethyl ether, diisopropyl ether, acetone, formaldehyde, propanal, methyl acetate, acetic acid, etc. The only restriction on the hydrocarbon requirement is based on the amount which will provide an ion concentration which will be convenient to measure. It will be apparent to the skilled worker in the art how much hydrocarbon to utilize in each case.

Burners used to combust the mixtures of the instant invention will be known to the skilled artisan. These include premixed flat flame burners, premixed single jet burners, diffusion flame single-jet burners, Bunsen burners, opposed jet burners, etc.

The gases which are utilized in the process of the instant invention are preferably premixed prior to combusting. Of course, when the oxygen is supplied from the air surrounding the burner source the mixing will occur at this point.

Various electrical devices may be utilized to measure the current passing through the flame. These include the various devices, known to the skilled artisan, for measuring currents in the micro- and milli-amp range.

The flow of the gases to the burner of the instant invention may vary widely, the only requirement is that sufficient gas is fed to the burner to insure a constant flame. The concentration of the various ingredients of the combustion mixture is also held constant during the process of the instant method.

The sample containing the inorganic sulfur compound may come from various sources including exhaust gas from combustion processes, gases from sewage and sewerage disposal plants, gases from desulfurization units in refineries, etc. Gas streams which may be analyzed by the process of the instant invention may contain particulate matter. The instant method is particularly useful for analyzing sulfurous and sulfuric acid which can form on particulate matter by the interaction of water and oxides of sulfur.

Another embodiment of the instant invention can be used when the sample containing the inorganic sulfur also contains hydrocarbons, hydrogen or carbon monoxide. The sample can be mixed with a large excess of air and fed to a catalytic converter prior to being mixed with hydrogen and hydrocarbon. This converter may contain a metal catalyst such as platinum on alumina which will oxidize any hydrocarbon, hydrogen or carbon monoxide contained in the sample stream to carbon dioxide and water. These latter compounds will not interfere with the ionization processes present in the flame. Nitrogen oxides will behave similarly to the inorganic sulfur-containing compounds and should be eliminated or their contribution to said flame ionization decrease accounted for by some other process. The catalytic converter will cause a slight decrease in oxygen due to the process of oxidation which occurs therein. This slight decrease will normally be insignificant where said hydrocarbons, hydrogen and carbon monoxide are present in small amounts.

The method of the instant invention can be operated at any pressure. Usually ambient pressures, i.e., one atmosphere, will be used because of convenience. The method of the instant invention can also be operated at any temperature at which the gaseous mixtures are combustible.

The following are preferred embodiments of the instant method.

A modified flame ionization detector was used to measure inorganic sulfur in the form of $SO_2$. A mixture of hydrogen plus 542 p.p.m. ethane as a fuel was introduced to an F & M model 609 gas chromatograph containing an empty column. Samples of $SO_2$ were introduced into the gas chromatograph by use of a gas-tight syringe to inject said sample through a rubber septum. The volume of the gas sample was measured with the syringe. The following conditions were used:

| | |
|---|---|
| Air flow | 360 ml./min. |
| Fuel flow | 110 ml./min. |
| He flow | 150 ml./min. |
| Fuel composition | 542 p.p.m. $C_2H_6$ in $H_2$. |

All volumes measured at 1 atmosphere and 25° C. temperature. The introduction of the $SO_2$ samples resulted in decreases in the current as measured by the chromatograph electrometer and recorded on a Leeds and Northrup strip chart recorder. The areas of these negative peaks are recorded in the following table.

| Sample size, ml. | Area of negative peak |
|---|---|
| 0.1 | 11,041 |
| .25 | 28,579 |
| .35 | 28,710 |
| .50 | 44,960 |
| .60 | 46,278 |
| .75 | 58.861 |
| 1.0 | 59,117 |

Areas are given in units of division minutes which refer to the recorder paper used. The area of the negative peak is thus seen to be proportional to the volume of $SO_2$ introduced into the gas chromatograph.

What is claimed is:

1. A process for determining the concentration of inorganic sulfur compounds, which comprises measuring the ion concentration decrease of a flame, produced by combusting a mixture comprising a hydrocarbon, hydrogen and oxygen, which results from introducing said inorganic sulfur compound into said flame.

2. The process of claim 1 wherein said inorganic sulfur compound is chosen from the group consisting of $SO_2$, $SO_3$, $H_2S$, COS, S, $H_2SO_4$ and $H_2SO_3$.

3. The process of claim 1 wherein said organic sulfur compound is $SO_2$.

4. The process of claim 1 wherein said hydrocarbon comprises from about 10 p.p.b. to 1% by volume of the hydrogen-hydrocarbon.

5. The process of claim 1 wherein the oxygen is provided by air.

6. The process of claim 1 wherein said ion concentration decrease is measured by a decrease in current flowing through an electrical circuit of which the flame is an integral part.

7. The process of claim 6 wherein said current decrease is measured by an ammeter in series with said circuit.

8. A process for determining the concentration of inorganic sulfur compounds in a gas stream, which comprises (a) burning a mixture of a hydrocarbon, oxygen, and hydrogen to produce a flame, (b) measuring the concentration of ions in said flame, (c) introducing said inorganic sulfur compound containing gas stream into said mixture of hydrocarbon, oxygen and hydrogen, and (d) measuring the decrease in concentration of ions in said flame.

9. A process for determining the concentration of inorganic sulfur compounds in a gas stream, which comprises (a) burning a mixture of a hydrocarbon, oxygen, and carbon monoxide to produce a flame, (b) measuring the concentration of ions in said flame, (c) introducing said inorganic sulfur compound-containing gas stream into said mixture of hydrocarbon, oxygen and carbon monoxide, and (d) measuring the decrease in concentration of ions in said flame.

10. A process for determining the concentration of inorganic sulfur compounds, which comprises measuring the ion concentration decrease of a flame, produced by combusting a mixture comprising an oxygenated hydrocarbon, hydrogen and oxygen, which results from introducing said inorganic sulfur .

References Cited

B. A. Schaefer: Anal. Chem., 42, No. 4, April 1970, pp. 448–456.

MORRIS O. WOLK, Primary Examiner

R. M. REESE, Assistant Examiner

U.S. Cl. X.R.

23—232 E, 254 EF